United States Patent [19]

Marhula

[11] Patent Number: 4,978,156
[45] Date of Patent: Dec. 18, 1990

[54] ICE CHIP CLEARING TOOL
[76] Inventor: Adolph V. Marhula, Rte. 1, Box 61D, Baudette, Minn. 56623
[21] Appl. No.: 365,309
[22] Filed: Jun. 13, 1989
[51] Int. Cl.$^5$ ............................................. A01K 97/00
[52] U.S. Cl. .......................................... 294/1.1; 43/4; 210/470; 294/19.1
[58] Field of Search ...................... 294/1.1, 9, 19.1, 26, 294/26.5, 49, 53.5, 55, 57; 4/255; 15/1.7, 104 R, 104.05, 104.16, 104.31, 145, 176.2, 176.3, 242; 30/325; 43/4, 5, 6.5, 11, 12, 55; 209/417–419; 210/238, 244, 470, 471; 366/342, 343

[56] References Cited

U.S. PATENT DOCUMENTS

| | | | |
|---|---|---|---|
| 674,197 | 5/1901 | Cooper | 15/104.31 |
| 1,654,965 | 1/1928 | Daniels et al. | 30/325 X |
| 2,004,756 | 6/1935 | Hess | 30/325 X |
| 2,608,695 | 9/1952 | Skibowski | 4/255 |
| 2,803,026 | 8/1957 | Koffski | 15/104.16 X |
| 2,914,926 | 12/1959 | Meagher | 43/4 X |
| 3,069,144 | 12/1962 | Patten | 366/343 |
| 3,289,850 | 12/1966 | Gubash | 210/470 |
| 3,380,592 | 4/1968 | Arnold | 210/470 X |
| 3,722,940 | 3/1973 | Misjak | 294/1.1 |
| 3,747,253 | 7/1973 | Gangi et al. | 294/26 X |
| 3,857,787 | 12/1974 | Kinne | 210/470 |
| 4,358,861 | 11/1982 | Sard | 15/104.31 X |
| 4,718,188 | 1/1988 | Roberts | 43/4 |
| 4,866,872 | 9/1989 | Guilbault et al. | 43/4 |

FOREIGN PATENT DOCUMENTS 116017  3/1946  Sweden ............................. 210/470

Primary Examiner—Johnny D. Cherry
Attorney, Agent, or Firm—Kinney & Lange

[57] ABSTRACT

An ice chip clearing tool is for clearing ice chips made by boring a cylindrical hole through the ice by pushing those chips under the ice. The tool includes a downwardly concave circular plate of about the same diameter as the bore hole, a handle, and a rigid shaft extending between the plate and the handle. Openings in the plate allow water to pass through the plate while preventing ice chips from passing therethrough. The tool is forced vigorously down through the fishing hole, carrying the chips a substantial distance below the bottom surface of the ice, and the tool is tipped to allow the chips to float up from the plate to position under the ice at a distance spaced from the ice fishing hole.

9 Claims, 3 Drawing Sheets

ICE CHIP CLEARING TOOL

BACKGROUND OF THE INVENTION

1. Field of the Invention

This invention has relation to a tool for clearing ice chips from a hole bored through the ice for the purpose of ice fishing.

2. Description of the Prior Art

For as long as man has used fishing lines and fish hooks, man in the northern climes has fished through holes cut in the ice. Initially man used axes and all kinds of heavy sharp tools to cut through the layer of ice to make holes through which fish lines, hooks and bait can be put into the water and through which hooked fish can be removed. Such crude methods result in much splashing of water which comes up into the hole as soon as the first small opening is cut clear through to the bottom surface of the ice. Any water coming above the ice hole will, of course, immediately begin to freeze on the upper surface of the ice, and on the clothes of the ice fisherman.

Ice fishing has become a very popular sport in the northern areas where bodies of water teaming with fish are frozen over to depths considered safe for supporting the fisherman and, oftentimes, even their cars or trucks. A practice developed many years ago of using ice boring tools to bore and chip away at the ice until a cylindrical opening is formed through to the body of water underneath. Being of lower density than the water from which it is formed, the ice chips formed when the hole is bored through the ice will all naturally tend to float to the surface of the water. This ice must be removed for satisfactory ice fishing. If allowed to remain, its presence will speed up the freezing over of the hole. If the hole is allowed to freeze over, of course, the ice fishing comes to an end.

Typically, some kind of a scoop or the bare or mittened hands of the fishermen themselves, have been used to lift the ice chips out onto the top surface of the ice. Here they rapidly freeze, adhering permanently to the ice where they are allowed to come to rest. Also, the scoop, or more importantly, the gloves of the ice fisherman will freeze because of the water encountered in attempting to remove all of the ice chips.

Many, if not most, ice fisherman arrange to have "fish houses" positioned over the bored holes. Typically, these houses are warmed by some kind of a gasoline or fuel oil fired heater. There is no convenient place for such ice chips inside of such a shack or house.

What was needed before the present invention was some way of getting all of the ice chips out of a newly bored cylindrical ice fishing hole without the ice chips having to come out through the top of the hole.

No preliminary search has been made of this invention; but the inventor is an experienced ice fisherman. Neither the inventor nor those in privity with him are aware of any prior art which is closer than the hand, glove, or scoop methods discussed above. Neither the inventor nor those in privity with him are aware of any prior art which anticipates the claims made herein.

SUMMARY OF THE INVENTION

An ice chip clearing tool is for clearing ice chips resulting from the boring of a cylindrical hole through the ice covering a body of water preparatory to fishing through the ice.

The ice chip clearing tool includes a downwardly dished plate of substantially the same size and configuration as a horizontal profile of the ice fishing hole. The plate is provided with a plurality of openings therethrough, the openings being of size and configuration to prevent ice chips of appreciable size from passing through the plate.

The tool also includes a handle and a shaft connected between the handle and the plate to lie at right angles to the plane of the periphery of the plate. The shaft will be of length to extend the plate at least a substantial distance below the bottom surface of the ice while the handle remains above the top surface of the ice.

In use, the tool will be vertically aligned over the ice fishing hole with the plate congruently aligned with the walls of the hole. The tool will be vigorously thrust straight down into the hole to bring the plate to a position at least a substantial distance below the bottom surface of the ice. Using the handle, the tool will be tilted to move the then top edge of the plate outside of the loci of the downward extension of the walls of the bored hole. The fisherman will maintain the tool in such tilted position long enough to allow ice chips on the concave face of the plate to float free of the plate and to reach the underside of the ice above.

The plate will be realigned with the fishing hole and the tool will be withdrawn through the ice slowly enough to allow water to pass through the plate openings so as not to cause a flow of chip bearing water from under the ice back into the hole.

This process will be repeated as necessary to clear any remaining ice chips from the hole.

BRIEF DESCRIPTION OF THE DRAWINGS

FIG. 5 is a fragmentary detail view of one form of joint for holding upper and lower portions of a foldable rigid shaft in locked position with respect to each other with a shaft locking sleeve shown in section; and FIG. 6 is a fragmentary view of the upper and lower portions of the shaft in folded or collapsed condition.

DETAILED DESCRIPTION OF THE PREFERRED EMBODIMENTS

Figure 1:
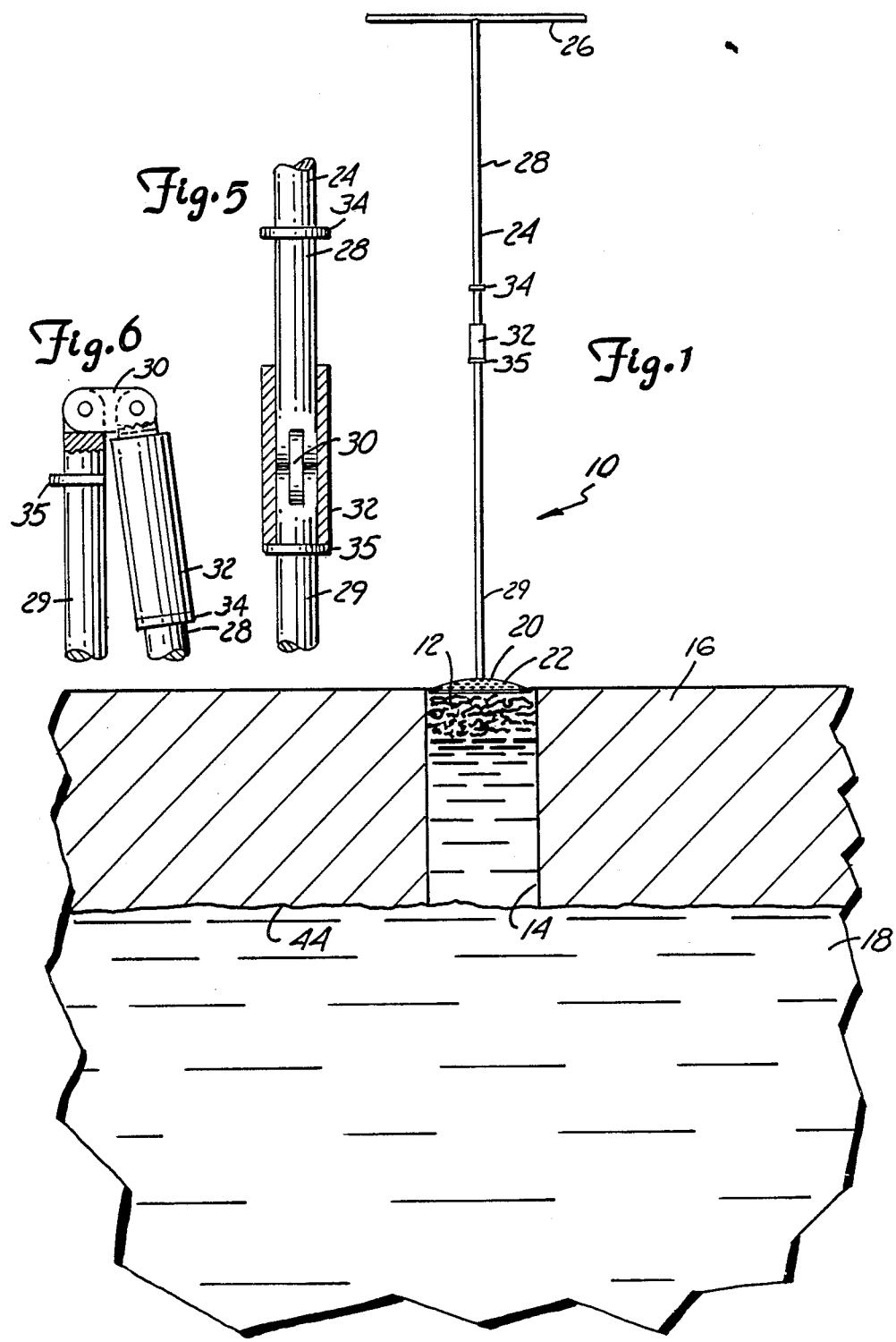
FIG. 1 is a side elevational view of a preferred form of the ice chip clearing tool of the invention in position to be used to clear ice chips from a cylindrical hole bored through the ice.

An ice chip clearing tool 10 is for use in clearing ice chips 12 resulting from the boring of a cylindrical hole 14 through an ice layer 16 formed over a body of water 18 preparatory to fishing through the ice.

There are large numbers of ice augers which have been developed for the purpose of boring a hole such as hole 14 through the ice. Some of them are manually operated and include a T-shape handle and shaft extending to ice chipping and boring blades, and some are power driven using power from automobile batteries of cars parked on the ice; power from electrical lines extending from shore to the ice; or power from internal combustion engines or the like connected to rotate a vertical shaft with cutting blades thereon. These boring tools form no part of the invention, but they all do operate by breaking ice chips of various sizes and shapes away from the ice to form a cylindrical hole such as the hole 14.

As shown, the tool includes a circular, pervious downward concave dished plate 20 provided with a plurality of relatively evenly spaced orifices 22 therethrough. Each plate 20, used by a particular fisherman or fishing party, will have a diameter substantially equal to the diameter of the fishing hole being cut by the auger used. Typically, these plates 20 will have a diameter of between six and twelve inches. It has been found satisfactory to constitute the orifices 22 to have diameters of about one-quarter inch. However, orifices of any shape or diameter such as to prevent ice chips of any appreciable size from passing through the plate while allowing relatively free passage of water therethrough have been found to be satisfactory. Any ice chips of maximum dimension of one quarter inch or less, for example, which pass through the plate in the process of removing the other chips, will rapidly melt in the above-freezing water of the body of water 18, and will, therefore, disappear and be of no consequence.

The chip clearing tool 10 also includes a rigid shaft 24, and a rigid, elongate handle 26 integral with the shaft 24. It is advantageous that this handle 26 be of a length greater than the diameter of the ice fishing hole 14 and consequently of the plate 20 so that the tool 10 cannot fall through the hole 14 accidentally.

In one form, the shaft 24 can be one piece rigidly connected to the handle 26 and to the pervious dished plate 20; but in the form of the invention as shown, the shaft consists of upper and lower portions 28 and 29 hinged to each other by a flat hinge link 30 and a shaft holding sleeve 32 slidably mounted on the shaft 24 and held within limits by upper and lower sleeve limiting collars 34 and 35.

The dished plate 20 could be welded or otherwise permanently affixed to the bottom end of the rigid shaft 24. As shown, however, that shaft is provided with a threaded, downwardly extending end portion 38. The dish plate 20 is provided with a centrally positioned fastening means receiving opening 40; and a nut 42 adapted to threadably receive the threaded end portion 38 of the shaft 24 is provided.

When the chip clearing tool 10 is to be stored or transported, the nut 42 and the plate 20 will be disassociated with the shaft 24; and the shaft will be doubled back on itself as seen in FIG. 6.

Figure 2:
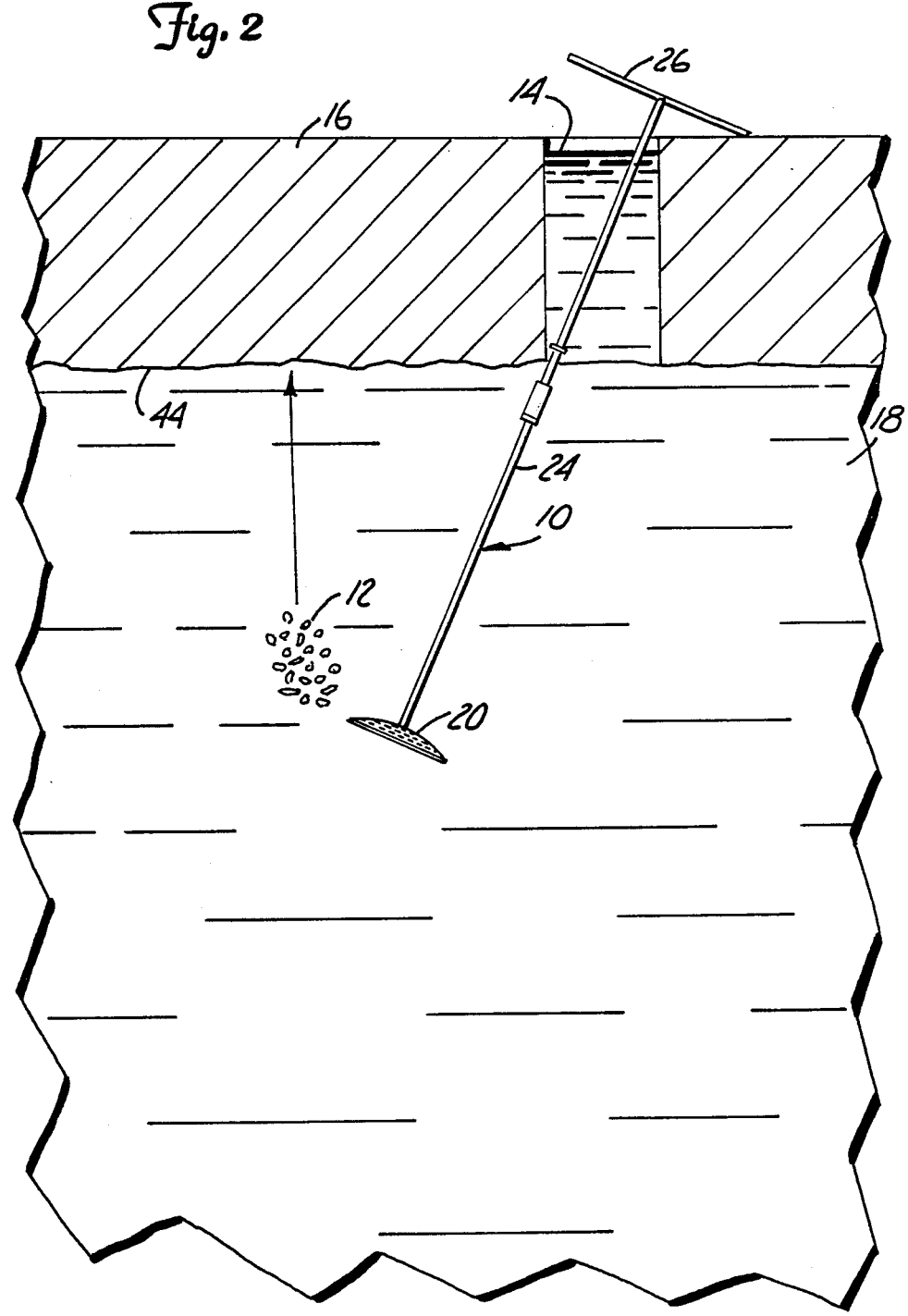
FIG. 2 is a side elevational view of the tool of FIG. 1 with the handle rotated slightly and positioned after the chips have been removed from the bored hole, and are being allowed to float to the underside of the ice.
Figure 3:
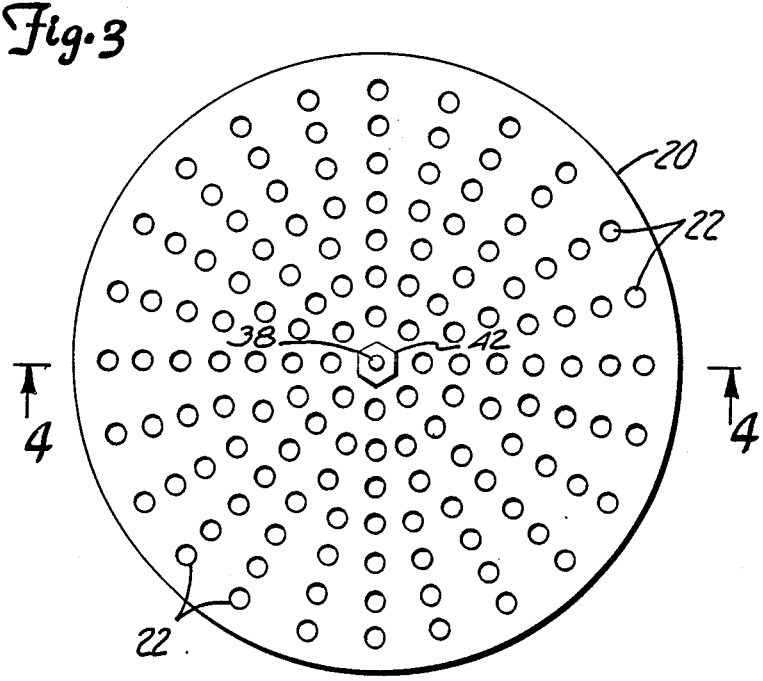
FIG. 3 is a bottom plan view of a concavely dished circular plate of the clearing tool.
Figure 4:
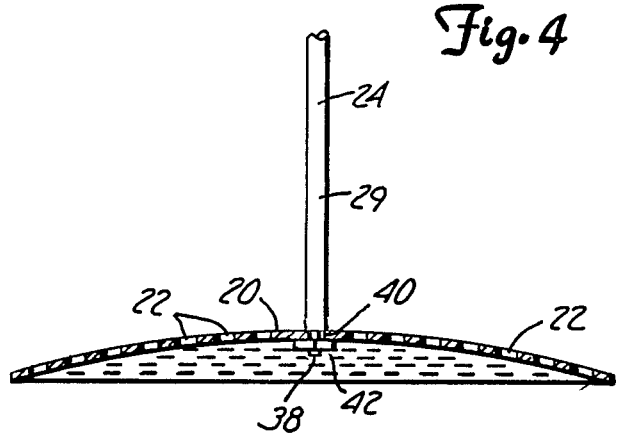
FIG. 4 is a vertical sectional view taken on the line 4—4 in FIG. 3.

When in use, the shaft will be fixedly assembled as seen in FIGS. 1 and 2, and the plate 10 will be rigidly attached to the shaft as clearly seen in FIGS. 3 and 4.

OPERATION

With the ice clearing tool positioned as seen in FIG. 1 with respect to the ice layer 16 and bored cylindrical ice fishing hole 14 over the body of water 18 and over the ice chips 12 floating on top of the water in the hole 14, the handle 26 will be used to vigorously plunge the pervious dished plate 20 to a position substantially below a bottom surface 44 of the ice layer 16. This motion will cause the water to flow through the orifices 22 tending to hold the ice chips in position in alignment directly under the plate 20 even after the plate moves below the surface 44.

In actual practice, it has been found that carrying the pervious dished plate 20 as much as two feet below the bottom surface 44 of the ice layer 16 is a distance substantial enough to accomplish the purposes of the invention.

When the plate reaches the position substantially below the surface 44 of the ice layer 16, it will be tilted, using handle 26, to a position approximately as seen in FIG. 2. Any tendency of the ice chips to freeze to each other when they are floated to the surface of the body of water within the hole 14 will be quickly overcome by their contact with the water below the ice layer which is, of course, higher than its freezing point. Ice is less dense than the water from which it is formed, so these ice chips will now float up to the now high side of the pervious plate to a position clear of the plate, and will float up to, and enter contact with, the bottom surface 44 of the ice layer 16. In bodies of water having an internal current, such as rivers, or lakes in adjacent relation to still open inlets or outlets, these chips will be carried along to a position spaced from the fishing hole 14. Where there is no current present, the chips will come into contact with the bottom surface 44 which is, of course, at or lower than the freezing temperature, where the ice chips will lodge and be frozen into place.

Tests have shown that this vigorous downward movement and subsequent tilting of the dished plate and maintenance of this tilted position long enough to let the ice chips float free, will result in the elimination of between 90% and 100% of all of the chips on the first plunge. However, any chips that have not been carried away in the manner described and which float back into the fishing hole 14 can be removed by repeating the method described another time or even several times as necessary.

Were the circular downwardly concave dished plate to be impervious, that is to have no holes in it, then it would act as a piston, and once clear of the fishing hole 14, water would rush in around its edges and tend to carry chips back up into the hole. Since, however, a plurality of orifices are provided in the plate 20, water flows freely through the plate as it is vigorously depressed using the handle and the shaft, and there is no appreciable tendency for a back flow of water into the fishing hole 14 as the plate clears the bottom of that hole.

As the tool is removed from the fishing hole each time, and as the pervious plate 20 moves up through the fishing hole 14, there is a free flow of water through these orifices 22. By removing the tool slowly enough so that none of the water in the fishing hole is carried substantially above its natural level as shown clearly in FIG. 2, there will be no tendency for any errant chips on the bottom surface 44 of the ice layer 16 to be carried back into the hole 14.

Although the present invention has been described with reference to preferred embodiments, workers skilled in the art will recognize that changes may be made in form and detail without departing from the spirit and scope of the invention.

What is claimed is:

1. For clearing ice chips resulting from the boring of a cylindrical hole through ice covering a body of water preparatory to fishing through the ice, an ice chip clearing tool including:
   (a) a downwardly concave circular plate of substantially the same diameter as the bored hole, the plate being provided with a plurality of openings therethrough, the openings being of size and configuration to prevent ice chips of appreciable size from passing through the plate while allowing water to pass therethrough;

(b) a handle;

(c) a rigid shaft extending downwardly from the handle and upwardly from the plate at right angles to the plane of the circumference of the plate, said shaft being of length to extend the plate at least a substantial distance below the bottom surface of the ice while the handle remains above the top surface of the ice.

2. The ice chip clearing tool of claim 1 wherein:

(d) the axis of the rigid shaft lies on a straight line and extends upwardly in concentric relation to the center of the circular plate.

3. The ice chip clearing tool of claim 2 wherein:

(e) the handle is rigidly connected to the shaft at right angles to the shaft axis.

4. The ice chip clearing tool of claim 3 wherein:

(f) the handle is an elongate handle and a midpoint of the handle is rigidly connected to the shaft and the length of the handle exceeds the diameter of the circular plate and the bored hole sufficiently to prevent the handle and upper portion of the shaft from passing through the bored hole.

5. The ice chip clearing tool of claim 1 wherein:

(d) the circular plate is provided with a fastener-receiving center opening therethrough and is removably secured to a bottom end of the shaft by a threaded fastening means threadably mounted with respect to a lowermost threaded portion of the shaft, said fastening means and said shaft engaging a portion of the plate peripheral to its fastener receiving opening.

6. The ice chip clearing tool of claim 1 wherein:

(d) the openings provided in the plate are relatively closely and uniformly spaced from each other over substantially the entire surface of the plate.

7. The ice chip clearing tool of claim 6 wherein:

(e) the downwardly dished circular plate is removably rigidly fastened to a bottom end of the shaft, and the plate is provided with a fastening means receiving opening through its center;

(f) the bottom end of the shaft includes a threaded portion; and a threaded fastening means adapted to be threadably mounted with respect to the threaded portion of the shaft is of configuration to rigidly engage the plate around its center opening and to hold it rigidly and fixedly against the bottom portion of the shaft when the central opening of the plate is concentrically aligned with the threaded portion of the shaft and of the fastening means and the fastening means is tightened against the shaft.

8. For clearing ice chips resulting from the cutting of a hole through ice covering a body of water preparatory to fishing through the ice, an ice chip clearing tool including:

(a) a downwardly concave plate of substantially the same size and configuration as a horizontal profile of the hole through the ice, the plate being provided with a plurality of openings therethrough, the openings being of size and configuration to prevent ice chips of appreciable size from passing through the plate;

(b) a handle;

(c) a rigid shaft extending downwardly from the handle and upwardly from the plate at right angles to the plane of the periphery of the plate, said shaft being of length to extend the plate at least a substantial distance below the bottom surface of the ice while the handle remains above the top surface of the ice.

9. The method of clearing ice chips from a hole bored through ice formed over a body of water, the method including the steps of:

(a) providing an ice chip clearing tool having a plate with a downwardly concave face, the plate having substantially the same size and shape as a horizontal profile of the bored hole, a handle, and a rigid shaft extending downwardly from the handle and upwardly from the plate at right angles to the plane of the periphery of the plate, the plate being provided with a plurality of openings therethrough, the openings being of size and configuration to prevent any ice chips of appreciable size from passing through;

(b) aligning the tool vertically over the hole with the plate concentric with the walls of the hole;

(c) vigorously thrusting the tool straight down against the ice chips in the hole to bring the plate to a position at least a substantial distance below the bottom surface of the ice;

(d) using the handle, tilting the tool to move an uppermost edge portion of the plate to a position outside of the loci of the downward extension of the walls of the bored hole;

(e) maintaining the tool in such position long enough to allow ice chips on the concave face of the plate to float free of the plate and reach the underside of the ice above;

(f) realigning the plate with the hole and withdrawing the tool through the hole slowly enough to allow water to pass through the plate openings so as not to cause a flow of chip bearing water from under the ice back into the hole; and (g) repeating steps (b) through (f) as necessary to clear any remaining ice chips from the hole.

* * * * *